US012765438B2

(12) United States Patent
Behling et al.

(10) Patent No.: US 12,765,438 B2
(45) Date of Patent: Oct. 20, 2026

(54) LAWN GROOMING HITCH

(71) Applicant: S & B Lawn Systems Inc., Brookfield, WI (US)

(72) Inventors: Stefan Behling, Brookfield, WI (US); Steven Sprinkmann, Germantown, WI (US)

(73) Assignee: S & B Lawn Systems Inc., Brookfield, WI (US)

( * ) Notice: Subject to any disclaimer, the term of this patent is extended or adjusted under 35 U.S.C. 154(b) by 458 days.

(21) Appl. No.: 18/465,711

(22) Filed: Sep. 12, 2023

(65) Prior Publication Data

US 2025/0057063 A1 Feb. 20, 2025

Related U.S. Application Data

(63) Continuation-in-part of application No. 29/910,186, filed on Aug. 16, 2023, now Pat. No. Des. 1,098,206.

(51) Int. Cl.
*A01B 59/042* (2006.01)
*A01B 45/00* (2006.01)

(52) U.S. Cl.
CPC ............ *A01B 59/042* (2013.01); *A01B 45/00* (2013.01)

(58) Field of Classification Search
CPC ..... A01B 59/042; A01B 59/04; A01B 59/002; A01B 45/02; A01B 45/023; B60D 2001/008; A01G 20/00
See application file for complete search history.

(56) References Cited

U.S. PATENT DOCUMENTS

| | | | |
|---|---|---|---|
| 62,822 | A | 3/1867 | Crowe |
| 261,638 | A | 7/1882 | Stanly |
| 1,168,713 | A | 1/1916 | Cummins |
| 1,291,295 | A | 1/1919 | Wagner et al. |
| 1,379,555 | A | 5/1921 | Goodfellow |
| 1,561,569 | A | 11/1925 | Roseman |
| 1,604,623 | A | 10/1926 | Whidden |
| 1,607,672 | A | 11/1926 | Gray |
| 1,654,767 | A | 1/1928 | Vannette |
| 1,663,900 | A | 3/1928 | Braun |
| 1,725,375 | A | 8/1929 | Seeley |
| 1,753,558 | A | 4/1930 | Edwards |
| 1,754,741 | A | 4/1930 | Cobb et al. |
| 1,757,844 | A | 5/1930 | Pol |
| 1,858,690 | A | 5/1932 | Stokes |
| 1,886,408 | A | 11/1932 | Locke et al. |
| 1,896,442 | A | 2/1933 | Farmer |
| 1,902,928 | A | 3/1933 | Worthington |
| 1,917,782 | A | 7/1933 | Vachon |
| RE19,272 | E | 8/1934 | Kurkchee |

(Continued)

FOREIGN PATENT DOCUMENTS

| | | |
|---|---|---|
| DE | 19919723 | 2/2001 |
| EP | 0267512 | 5/1988 |

*Primary Examiner* — Christopher J Sebesta
*Assistant Examiner* — Blake E Scoville
(74) *Attorney, Agent, or Firm* — Andrus Intellectual Property Law, LLP

(57) ABSTRACT

A lawn grooming system includes a hitch. The hitch includes a mounting bracket and a pivot member pivotably connected to the mounting bracket. The pivot member includes a cylinder. An intermediate coupler includes a pipe and a sleeve. The pipe is rotatably received within the cylinder. A projection is rotatably received within the cylinder.

20 Claims, 8 Drawing Sheets

(56) References Cited

U.S. PATENT DOCUMENTS

| | | | |
|---|---|---|---|
| 1,995,785 A | | 3/1935 | Thomas |
| 2,032,467 A | | 3/1936 | Burke |
| 2,113,191 A | | 4/1938 | Caudry |
| 2,139,200 A | | 12/1938 | Moyer |
| 2,148,841 A | | 2/1939 | Senior |
| 2,153,876 A | | 4/1939 | Roseman |
| 2,177,189 A | | 10/1939 | Roseman |
| 2,198,526 A | | 4/1940 | Cockburn |
| 2,200,835 A | | 5/1940 | Coates |
| 2,231,821 A | | 2/1941 | Sprouse |
| 2,258,061 A | | 10/1941 | Krenzke |
| 2,282,837 A | | 5/1942 | Wahrenbrock |
| 2,320,387 A | | 6/1943 | Schroeder |
| 2,338,698 A | | 1/1944 | White |
| 2,476,526 A | | 7/1949 | Badlat |
| 2,483,846 A | | 10/1949 | Roche |
| 2,520,488 A | | 8/1950 | Batchelder |
| 2,569,736 A | | 10/1951 | Snyder |
| 2,613,756 A | | 10/1952 | Smith |
| 2,629,222 A | | 2/1953 | Johnston |
| 2,689,444 A | | 9/1954 | Boggs |
| 2,796,718 A | | 6/1957 | Nadler |
| 2,830,421 A | | 4/1958 | Blue et al. |
| 2,890,561 A | | 6/1959 | Bonner, Jr. et al. |
| 2,973,535 A | | 3/1961 | Olay |
| 2,973,613 A | | 3/1961 | Hagedorn |
| 3,058,280 A | | 10/1962 | Lewis |
| 3,106,812 A | | 10/1963 | Mcdonagh |
| 3,171,498 A | | 3/1965 | Logan |
| 3,190,061 A | | 6/1965 | Gilbertson |
| 3,257,753 A | | 6/1966 | Zennie |
| 3,260,042 A | | 7/1966 | Hanson et al. |
| 3,402,535 A | | 9/1968 | Nelson |
| 3,514,126 A | | 5/1970 | Fuss |
| 3,525,201 A | | 8/1970 | Kaufman |
| 3,537,720 A | | 11/1970 | Irgens |
| 3,555,793 A | | 1/1971 | Chapman |
| 3,608,284 A | | 9/1971 | Erdman |
| 3,650,096 A | | 3/1972 | Caldwell |
| 3,757,500 A | | 9/1973 | Averitt |
| 4,021,996 A | | 5/1977 | Bartlett et al. |
| 4,063,748 A | | 12/1977 | Schmidt |
| 4,084,284 A | | 4/1978 | Hastings |
| D258,657 S | | 3/1981 | Stark |
| 4,330,981 A | | 5/1982 | Hall et al. |
| 4,344,273 A | | 8/1982 | Jobling et al. |
| 4,481,757 A | | 11/1984 | Tsuchiya |
| 4,637,625 A | | 1/1987 | Blackwell |
| 4,638,622 A | | 1/1987 | Smith |
| 4,747,174 A | | 5/1988 | Hightower |
| 4,796,322 A | | 1/1989 | Steed et al. |
| 4,836,573 A | | 6/1989 | Gebhard |
| 4,892,327 A | | 1/1990 | Cabagnero |
| 4,896,485 A | | 1/1990 | Gordy |
| 4,899,828 A | | 2/1990 | Harris |
| 4,989,676 A | | 2/1991 | Rogers |
| 5,056,805 A | | 10/1991 | Wang |
| 5,069,022 A | | 12/1991 | Vandermark |
| 5,197,265 A | | 3/1993 | Hiratsuna et al. |
| 5,217,242 A | | 6/1993 | Bernd |
| 5,228,277 A | | 7/1993 | Smith et al. |
| 5,261,213 A | | 11/1993 | Humphrey |
| 5,423,565 A | * | 6/1995 | Smith ...................... B60D 1/07 280/411.1 |
| 5,586,604 A | | 12/1996 | Postema |
| 5,661,962 A | | 9/1997 | Monaco |
| D395,900 S | | 7/1998 | Shannon et al. |
| 5,870,888 A | | 2/1999 | Pugh |
| 5,921,324 A | | 7/1999 | Anderson |
| 6,047,530 A | | 4/2000 | Bednar |
| 6,098,492 A | | 8/2000 | Juchniewicz et al. |
| 6,119,788 A | | 9/2000 | Bernier |
| 6,122,904 A | | 9/2000 | De Alba |
| 6,131,378 A | | 10/2000 | Lees |
| 6,203,049 B1 | * | 3/2001 | Gibson .................. B60D 1/155 280/494 |
| 6,523,335 B2 | | 2/2003 | Vanderipe |
| 6,659,191 B1 | | 12/2003 | Humphrey |
| 6,688,094 B2 | * | 2/2004 | Berndt ................... A01D 34/62 56/7 |
| 6,945,021 B2 | | 9/2005 | Michel |
| 6,962,039 B2 | | 11/2005 | Greenhoe |
| 7,024,845 B2 | | 4/2006 | Kallevig et al. |
| 7,069,711 B1 | | 7/2006 | Connell et al. |
| D584,747 S | | 1/2009 | Sprinkmann et al. |
| 7,478,681 B2 | | 1/2009 | Alston |
| D607,902 S | | 1/2010 | Sprinkmann |
| 7,819,416 B2 | * | 10/2010 | Moss ....................... B60D 1/07 280/491.1 |
| 8,112,976 B1 | | 2/2012 | Kallevig et al. |
| 10,045,473 B2 | * | 8/2018 | Garcia ................. A01B 59/042 |
| 10,791,664 B2 | * | 10/2020 | Garcia ................. A01B 59/042 |
| 2002/0011055 A1 | | 1/2002 | Meyer |
| 2003/0230067 A1 | | 12/2003 | Weinlader |
| 2008/0314605 A1 | | 12/2008 | Degelman et al. |
| 2009/0113864 A1 | | 5/2009 | Eavenson et al. |
| 2009/0255228 A1 | * | 10/2009 | Sprinkmann ........ A01D 43/006 172/349 |
| 2010/0300056 A1 | | 12/2010 | Sprinkmann |
| 2012/0186214 A1 | | 7/2012 | Michel |
| 2012/0217724 A1 | * | 8/2012 | Works ...................... B60D 1/46 280/490.1 |
| 2015/0096278 A1 | | 4/2015 | Sprinkmann et al. |
| 2017/0332542 A1 | * | 11/2017 | Garcia ................. A01B 59/042 |

* cited by examiner

LAWN GROOMING HITCH

CROSS-REFERENCE TO RELATED APPLICATIONS

The present application is a continuation-in-part of U.S. Design Pat. Application No. 29/910,186, filed on Aug. 16, 2023, which is hereby incorporated by reference in its entirety.

FIELD OF THE DISCLOSURE

The present disclosure relates to lawn care. More particularly, the present disclosure relates to a hitch system for securing lawn grooming implements to a garden tractor.

BACKGROUND

Lawn grooming implements are typically towed behind a mower and perform mechanical operations which contribute to the aesthetic or health of a lawn. Mowers include gas or electrically driven garden tractors. Lawn grooming implements may be used in residential and commercial settings. Lawn striping implements aesthetically alter the appearance of mowed grass by bending blades of grass in a generally uniform direction. Lawn striping implements are used for grooming sports fields, golf greens, or ornamental gardens.

Ball hitches and clevis pin hitches are known and common hitch configurations currently used to secure lawn grooming implements to garden tractors. US Patent Application Publication Nos. 2009/0255228, 2010/0300056, and 2015/0096278 disclose some examples of lawn striping implements and are incorporated by reference herein in their entireties. These examples of lawn striping implements, or other known lawn grooming implements may be secured to a garden tractor with the aforesaid ball hitches or clevis pin hitches.

BRIEF DISCLOSURE

An example of a lawn grooming system includes a hitch. The hitch includes a mounting bracket. A pivot member is pivotably connected to the mounting bracket. The pivot member includes a cylinder. An intermediate coupler includes a pipe and a sleeve. The pipe is rotatably received within the cylinder. A projection is rotatably received within the cylinder.

In examples of the lawn grooming system a lawn grooming implement is connected to the projection and is selectively coupled to the hitch. The lawn grooming implement may be a lawn striping implement that includes a cover and a roller drum rotatably connected to the cover. A plate may connect the projection to the cover. The plate may include at least one handle.

In other examples of the lawn grooming system the mounting bracket includes a bumper extending between opposed faces. The pivot member may be pivotably connected to the opposed faces. The mounting bracket includes flanges extending from the bumper and configured to be secured to the back of a motive device with a plurality of fasteners. The pivot member includes plates that are pivotably connected to the faces and arms extend medially from the plates to connect the plates to the cylinder. Each face of the mounting bracket includes a retention hole and the plates each include a retention pin configured to selectively project through a respective retention hole to selectively retain the pivot member in an upright position.

In further examples of a lawn grooming system, the sleeve may be connected orthogonally to the pipe. The cylinder includes two opposed holes and the pipe includes two opposed slots. The opposed slots of the pipe are configured to align with the opposed holes of the cylinder. A fastener received through the two opposed holes and the two opposed slots axially retains the pipe within the cylinder and defines an arc of rotation of the pipe within the cylinder. The cylinder includes a pair of opposed locking holes and the pipe includes a pair of opposed locking holes. The pairs of locking holes are configured to align. A locking pin is selectively received through the pairs of locking holes to prevent rotation between the pipe and the cylinder. The projection includes two opposed holes and the sleeve comprises two opposed slots. The opposed slots of the sleeve are configured to align with the opposed holes of the projection. A fastener is received through the two opposed slots and the two opposed holes to axially retain the projection within the sleeve and to define an arc of rotation of the projection within the sleeve. The projection includes a pair of opposed locking holes and the sleeve comprises a pair of opposed locking holes. The pairs of locking holes are configured to align. A locking pin is selectively received through the pairs of locking holes to prevent rotation between the projection and the sleeve. In an example of the lawn grooming system, the pivot member pivots about a first axis in a first dimension, the pipe rotates within the cylinder about a second axis in a second dimension, and the projection rotates within the sleeve about a third axis in a third dimension, wherein the first, second, and third dimensions are orthogonal to one another.

An example of a hitch for use in lawn grooming includes a mounting bracket. A pivot member includes opposed plates connected to the mounting bracket, a cylinder and arms extending between the cylinder and the opposed plates. An intermediate coupler includes a pipe and a sleeve, wherein the pipe is rotatably received within the cylinder and the sleeve is configured to rotatably receive a projection therein.

In examples of the hitch the opposed plates pivot relative to the mounting bracket about a first axis in a first dimension, the pipe rotates within the cylinder about a second axis in a second dimension, and the sleeve is configured for the projection to rotate within the sleeve about a third axis in a third dimension, wherein the first, second, and third dimensions are orthogonal to one another. The sleeve includes first opposed slots configured to receive a first fastener therethrough. The first opposed slots are configured to define an arc of rotation of the projection within the sleeve. The cylinder includes opposed holes and the pipe includes second opposed slots. The second opposed slots of the pipe are configured to align with the opposed holes of the cylinder. A second fastener is received through the opposed holes and the second opposed slots to axially retain the pipe within the cylinder and to define an arc of rotation of the pipe within the cylinder. The cylinder includes pair of opposed locking holes. The pipe includes a second pair of locking holes. The sleeve includes a third pair of locking holes. A first locking pin is selectively received through first and second pairs of locking holes to prevent rotation between the pipe and the cylinder. A second locking pin is selectively received through the third pair of locking holes to configure the sleeve to prevent rotation between the sleeve and the projection. The mounting bracket includes two opposed faces. Each face of the mounting bracket includes a retention hole. Each opposed plate includes a retention pin configured to selectively project through a respective retention hole to selectively retain the pivot member in an upright position.

DETAILED DISCLOSURE

Figure 1:
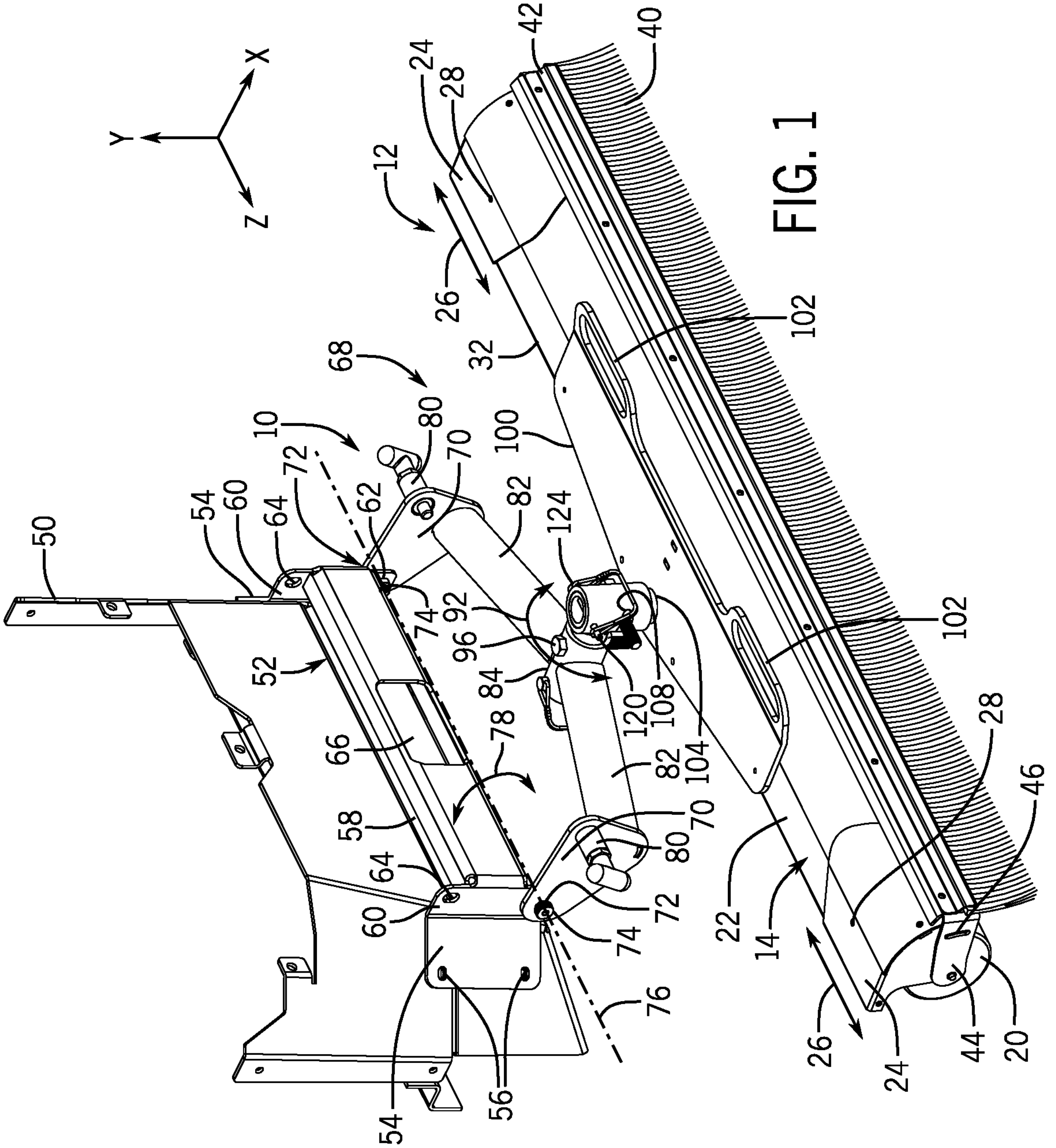
FIG. 1 is a top perspective view of a hitch and lawn grooming implement.

FIG. 1 is a top perspective view of a hitch 10 and a lawn grooming implement 12 attached thereto. The lawn grooming implement 12 is exemplarily a lawn striping implement, but it will be recognized from the present disclosure that the hitch 10 as described herein may also be used with other types of lawn grooming implements 12. The inventors' co-pending application Ser. No. 18/183,736, entitled "Lawn Grooming Device" provides additional disclosure regarding lawn striping implements, and is incorporated by reference herein in entirety. The hitch 10 as well be described herein in further detail exemplarily connects a lawn grooming implement 12 to a garden tractor, however, it will be recognized that the hitch 10 may secure a lawn grooming implement to other devices, including, but not limited to: gas or electric walk-behind or riding mowers, commercial garden tractors, or autonomous or remote-controlled mowers.

Figure 2:
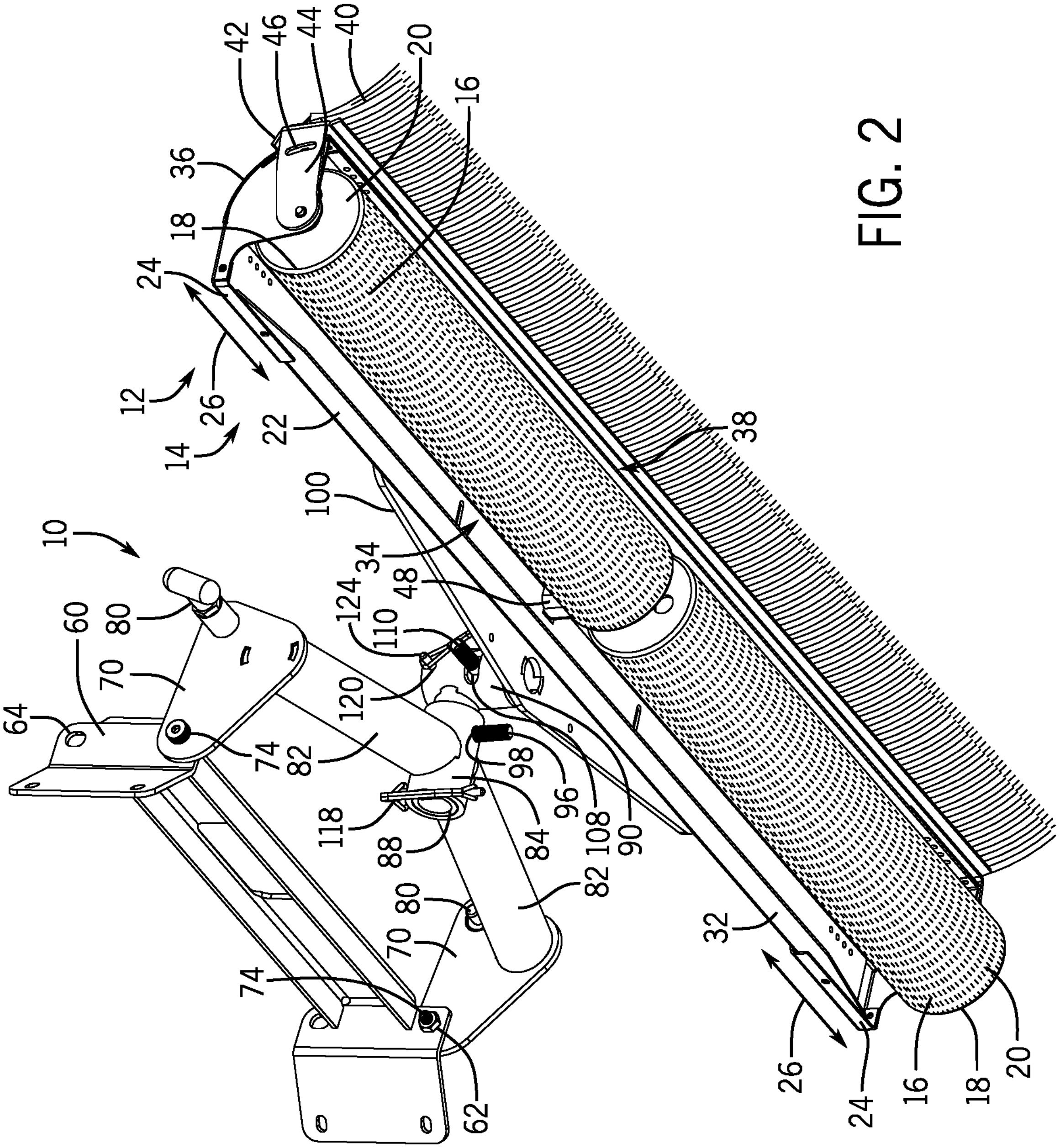
FIG. 2 is a bottom perspective view of the hitch and lawn grooming implement.
Figure 3:
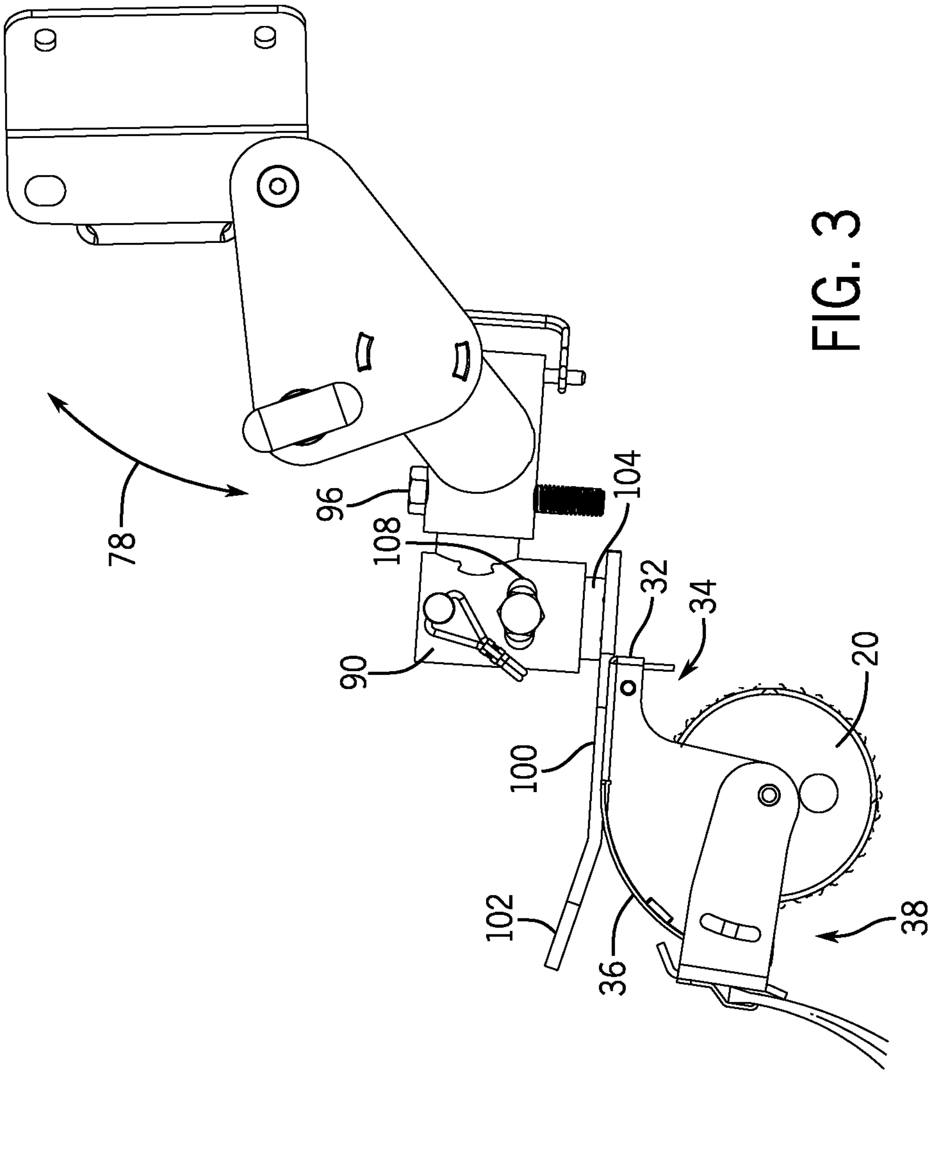
FIG. 3 is a side view of the hitch and lawn grooming implement.
Figure 4:
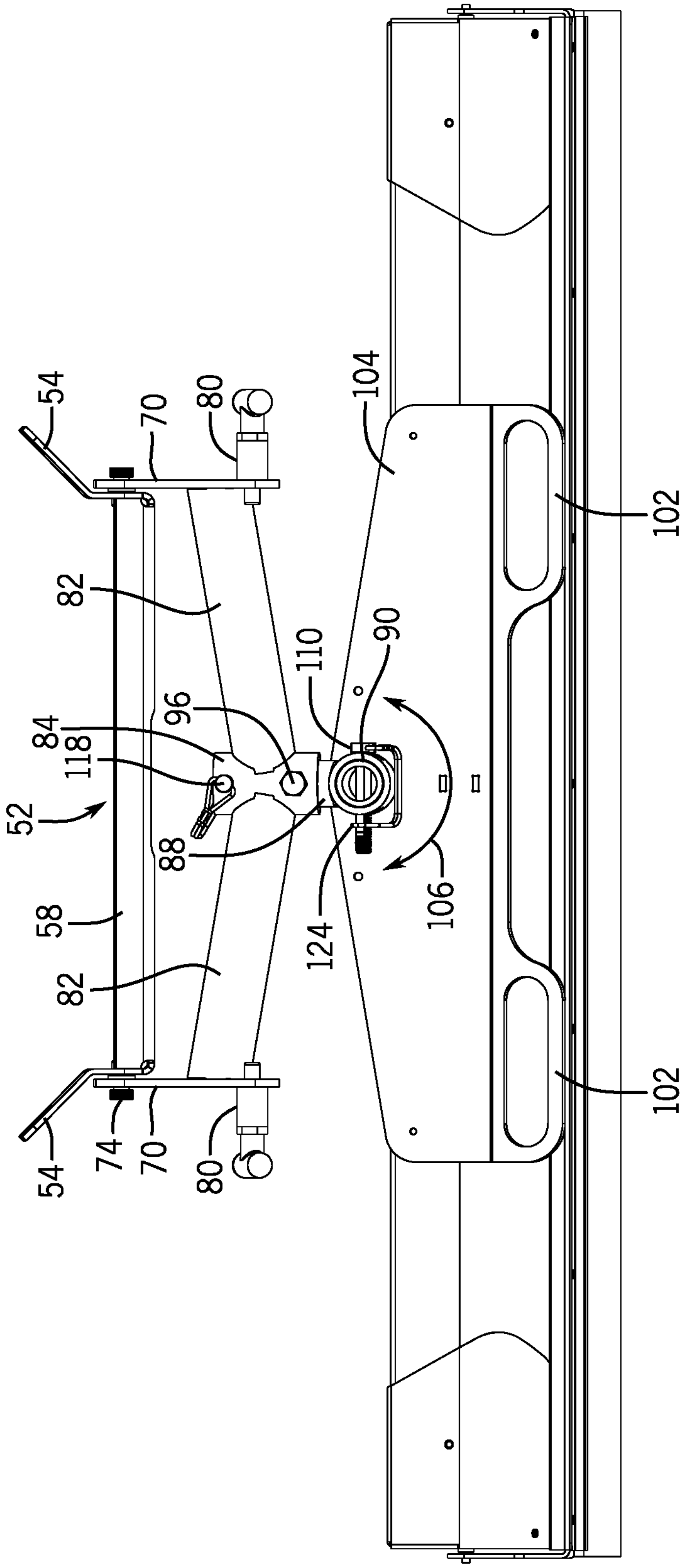
FIG. 4 is a top view of the hitch and lawn grooming implement.

The lawn grooming implement 12 includes a roller drum 20 rotatably secured within a cover 14. FIG. 2 is a bottom perspective view of the hitch 10 and the lawn grooming implement 12, which provides a view of the roller drum 20 within the cover 14. FIG. 3 is a side view of the hitch 10 and the lawn grooming implement 12 and FIG. 4 is a top view of the hitch 10 and the lawn grooming implement 12. In the example shown in FIG. 2, two roller drums 20 are secured within the cover 14. The roller drums 20 include a plurality of ribs 16 on an outer surface 18 of the roller drums. In examples, a roller drum 20 defines an open interior (not depicted) which is filled with sand, water, or another flowable or granular material having a comparatively high density such that a mass of the roller drum 20 can be greatly increased by filling the open interior with such material.

The roller drums 20 are rotatably secured within the cover 14. In use, the mass of the roller drums 20 and the ribs 16 across the outer surface 18 of the roller drums 20 operate to bend blades of grass in a direction of travel of the grooming device, producing a visual striping effect on the grass.

The cover 14 may include a shroud 22 and ends 24. The ends 24 are shaped to nestingly fit over the shroud 22. The ends 24, being separate components from the shroud 22 are translatable relative to the shroud 22. In the directions of arrows 26. This may facilitate assembly of the roller drum 20 within the cover 14. The ends 24 are secured by one or more fasteners 28 to the shroud 22 to define a width of the grooming device. In examples, the fasteners 28 may be pins or screws that fit through holes in the ends 24 and also connect through incremented apertures 30 through the shroud 22 (FIG. 2). In another example, the ends 24 include projections or pawls (not depicted) which releasably fit within the apertures 30. In this manner, the cover 14 is adjustable to accommodate a range of widths of roller drums 20, for example between 20-30 inches, although lesser or greater roller drum widths will be recognized as being within the present disclosure. The cover 14 may be dimensioned to retain two (or more) roller drums 20, for example, to provide a lawn grooming implement 12 having an exemplary and non-limiting width between 40-60 inches. In such an example a mounting hub 48 within the cover 14, the roller drums 20 being rotationally connected to the mounting hub 48 so as to axially rotate between the hub 48 and a respective end 24 of the cover 14.

The cover 14 exemplarily has a curved portion 36 that is co-axial with the roller drum 20. A leading edge 32 of the cover 14 defines a leading opening 34, which is exemplarily directed towards the mower to which the lawn grooming implement 12 is secured and which is also generally the direction of travel for the lawn grooming implement 12. The leading opening 34 is opposite the curved portion 36 of the cover 14. The curved portion 36 of the cover 14, terminates at a position above a bottom of the roller drum 20, or that portion of the roller drum which during operation would presently be in contact with the ground. This leaves a trailing opening 38 generally opposite the leading opening 34.

The lawn grooming implement 12 further includes a brush 40 connected to a mounting bar 42. The mounting bar 42 is pivotally connected by arms 44 to the cover 14. The mounting bar 42, and the brush 40 connected to the mounting bar 42, are thus pivotable relative to the cover 14 and the roller drum 20. In effect, this provides for a positional adjustment of the brush 40 relative to the trailing opening 38 and the ground upon which the roller drum 20 rests. The position of the mounting bar 42 and the brush 40 relative to the cover 14 and the roller drum 20 is releasably fixed by at least one fastener 46, which is exemplarily a threaded fastener. In operation, the brush 40 helps in the lawn grooming process by evening and spreading out any clumps of cut grass left by the mower. The brush 40 further reinforces the bending and direction of the blades of grass by the roller drum 20.

The presently disclosed solutions provide a flexible configuration and arrangement for attachment of the lawn grooming implement 12 to mowers, while establishing an effective positional relationship between the lawn grooming implement 12 and the mower to achieve intended grooming effects. Lawn striping implements differ from some other types of lawn grooming implements in that ground contact between the roller and the lawn is important for effective setting of consistent lawn stripes. Therefore, it has been recognized by the inventors that improved hitch systems are needed for lawn grooming implements, in particular, lawn striping implements, that provide flexible configuration and arrangement as well as three-axes of implement movement. The flexible arrangement and movement promotes roller ground contact, even with sloped, graded, or uneven lawns.

Figure 5:
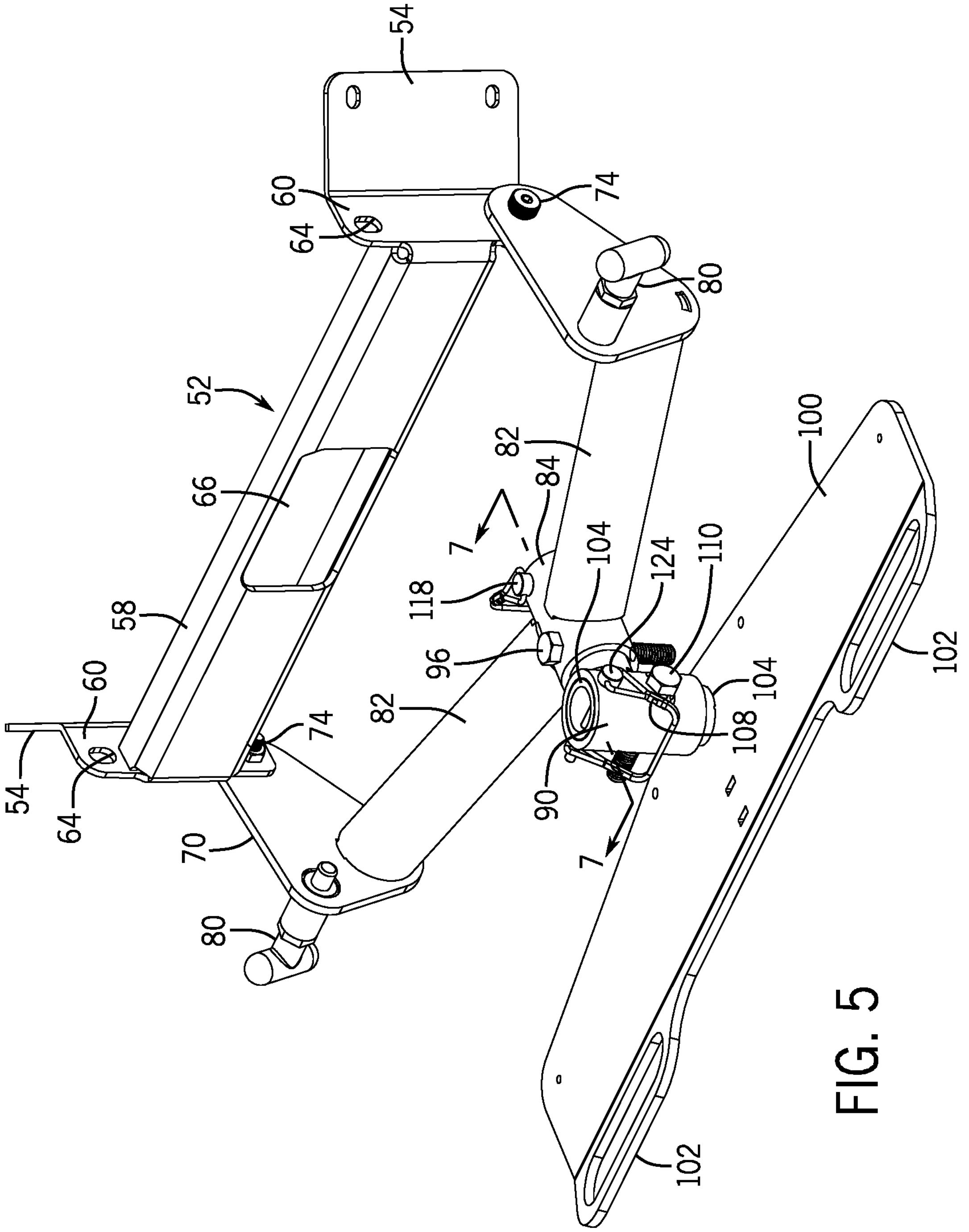
FIG. 5 is a perspective view of the hitch.
Figure 6:
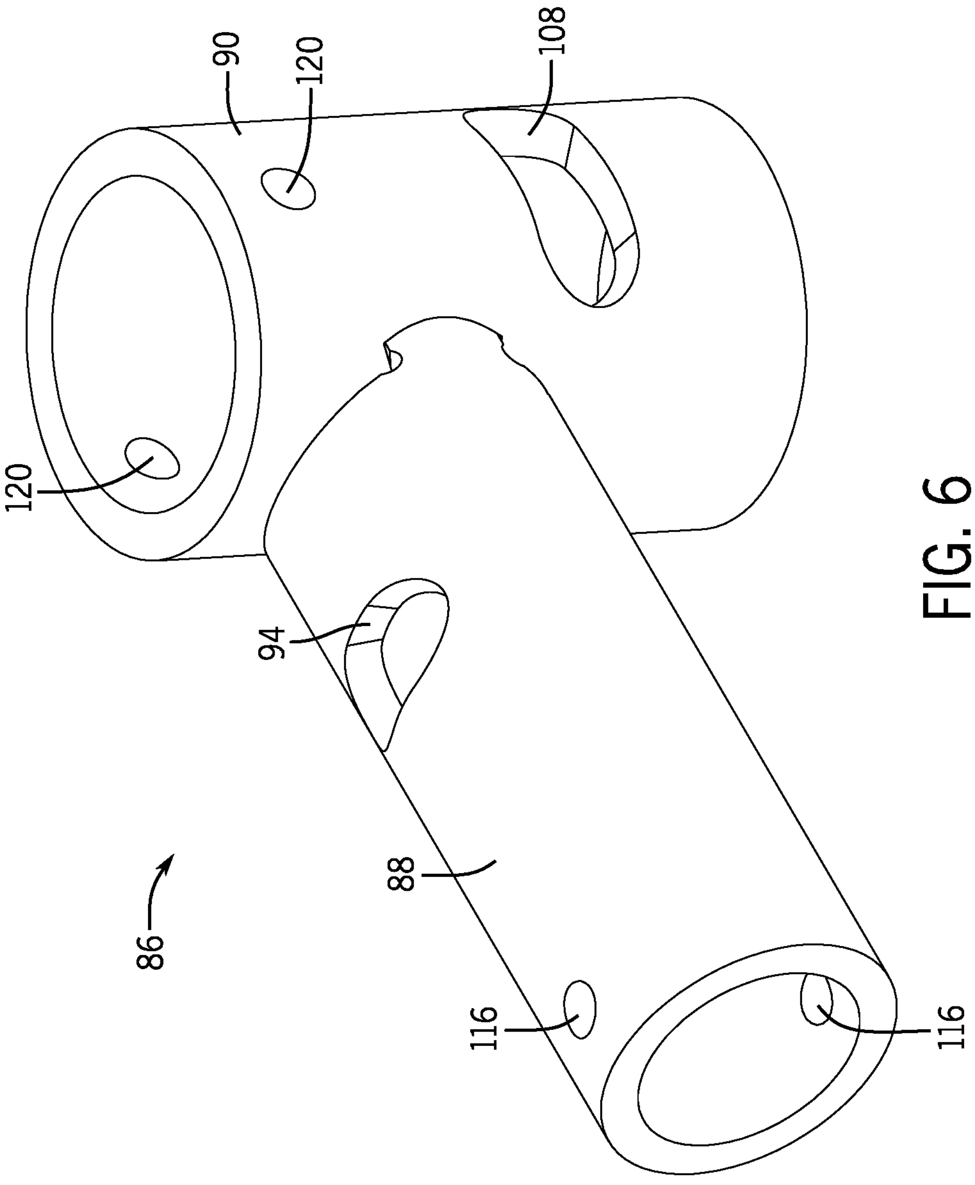
FIG. 6 is an isolated view of an intermediate coupler.

FIG. 5 is a perspective view of the hitch 10. The hitch 10 secures the lawn grooming implement 12 to a motive device, exemplarily a garden tractor 50. A mounting bracket 52 is secured to a back end of the garden tractor 50. The mounting bracket 52 includes flanges 54 which are angled to complement a corresponding surface of the garden tractor 50. Fasteners 56, for example, threaded bolts secure through the flange 54 to the garden tractor 50. In other non-limiting examples, the mounting bracket 52 may be welded to the garden tractor 50 or may be integrally formed with existing components of the garden tractor 50. A variety of mounting bracket 52 dimensions, constructions, and configurations are contemplated within the present disclosure so as to complement and connect to the back ends of a variety of commercially available motive devices, including the garden tractor 50.

The mounting bracket includes a bumper 58 that extends horizontally between the flanges 54. The bumper 58 extends proud of the flanges 54 and exemplarily of the garden tractor 50 as well. A window 66 provides visual and/or physical access through the bumper 58 to the garden tractor 50, this may exemplarily and non-limitingly, accommodate a traditional square hitch receiver, a license plate, a backup light or camera or an exhaust port of the garden tractor 50. A face 60 extends in a vertical plane at each end of the bumper 58. Each face 60 includes a pivot hole 62 and a retention hole 64. The pivot hole 62 and the retention hole 64 are vertically spaced with the pivot hole 62 lower than the retention hole 64.

Figure 8:
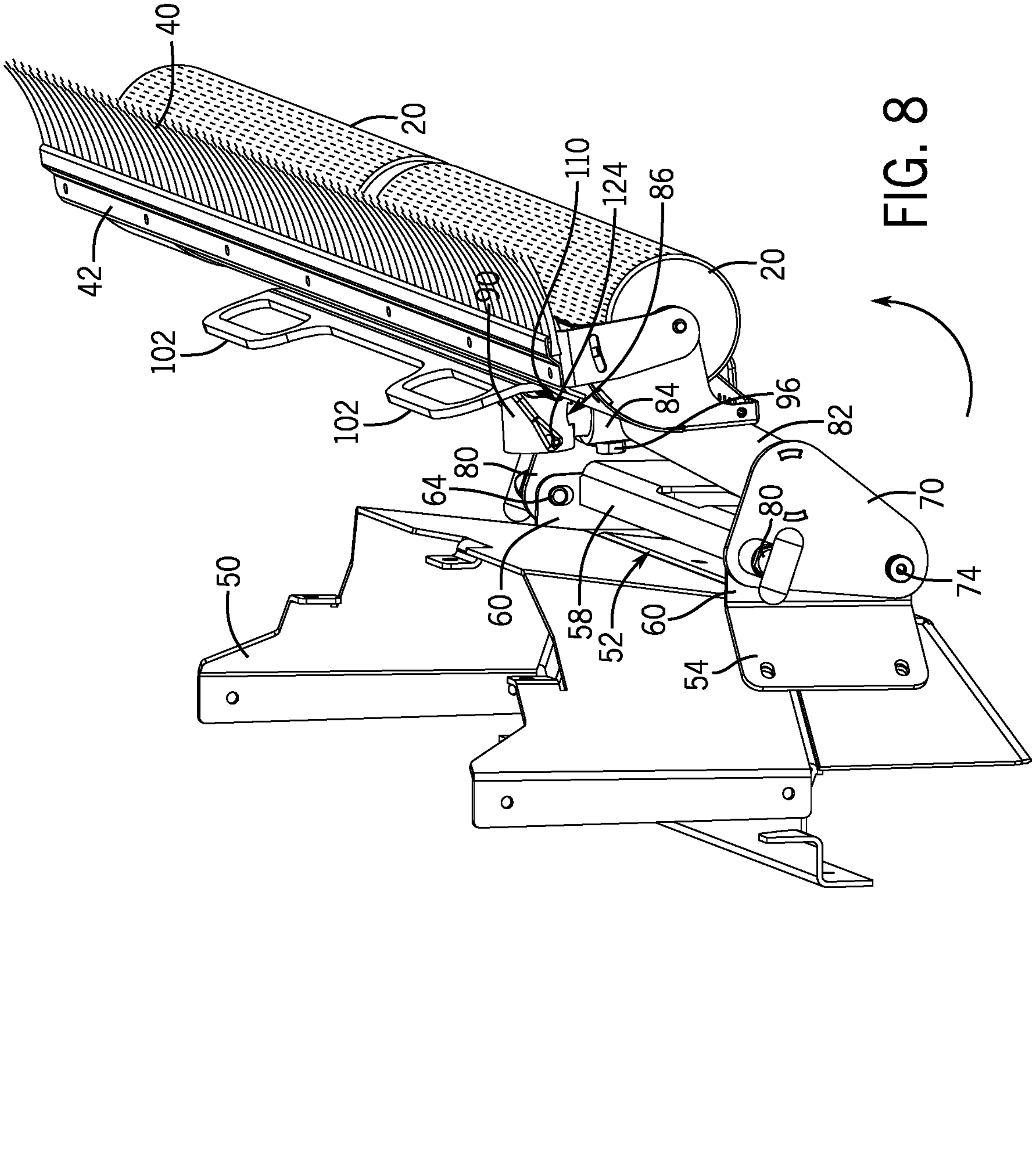
FIG. 8 depicts the hitch and lawn grooming implement in an upright position.

A pivot member 68 of the hitch 10 is secured between the mounting bracket 52 and the lawn grooming implement 12. The pivot member 68 includes opposed plates 70, the plates 70 include pivot holes 72 and pivot pins 74 respectively extend through pivot holes 72 of the plates 70 and through pivot holes 62 of the mounting bracket 52. The pivot pins 74 pivotably secure the pivot member 68 to the mounting bracket 52 such that the pivot member 68 and the lawn grooming implement 12 connected thereto is pivotable in the direction of arrow 78, exemplarily in the z-axis of the coordinate system depicted in FIG. 1. A retention pin 80 through each of the opposed plates 70 selectively extends into the retention holes 64 in the mounting bracket 52 to secure the pivot member 68 in an upright position. The retention pin 80 is exemplarily a spring-biased T-pin mounted to the respective plates 70. A spring internal to an assembly of the T-pin biases the pin in an extended position, extending internally from the plate 70. A user-applied force on a handle of the T-pin overcomes this bias to retract the pin, enabling repositioning the pivot member 68 into or from the upright position. While FIGS. 1 and 5 provide examples of the pivot member 68 of the hitch 10 in an operative position, FIG. 8 depicts an example of the pivot member 68 in the upright position.

Arms 82 are respectively connected to plates 70 and extend medially from the plates 70 to a cylinder 84 positioned centrally between the plates 70. The arms 82 are exemplarily connected to the plates 70 and to the cylinder 84 by welding. Additionally, the arms may include one or more tabs at either end that fit within slots respectively in the plates 70 and the cylinder 84 to ensure alignment and physical retention during welding, such tabs may also facilitate force transfer between these components.

Figure 7:
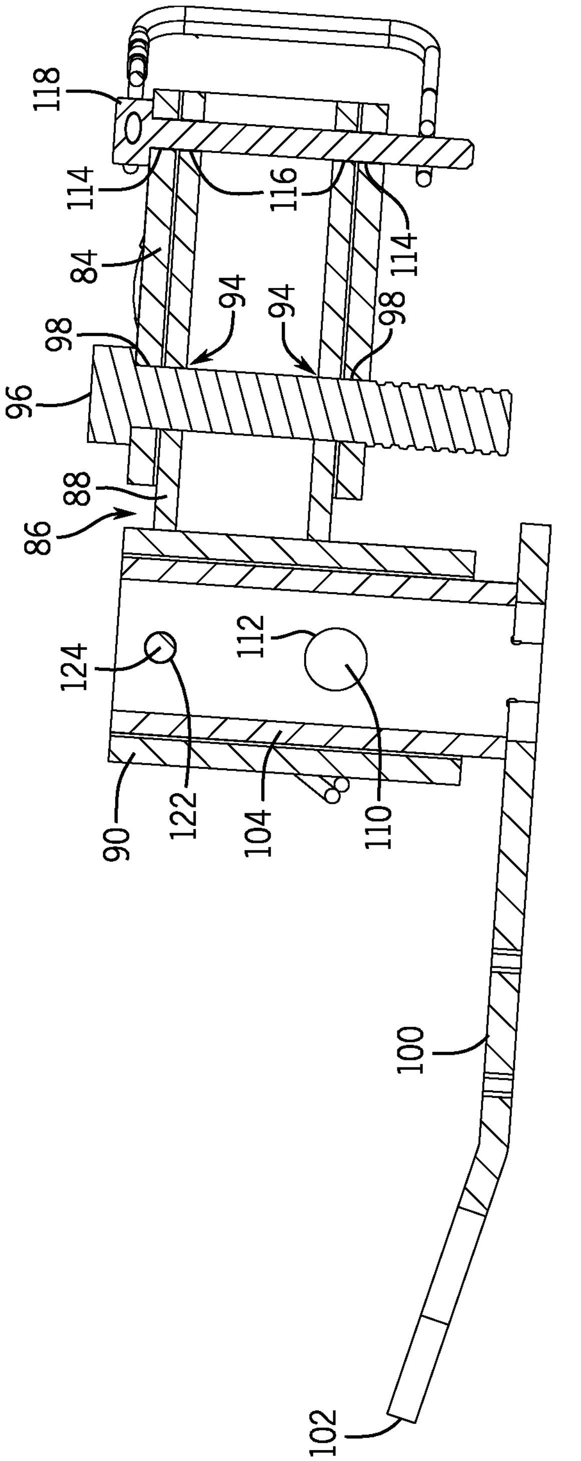
FIG. 7 is an isolated cross-sectional view taken along line 7-7 in FIG. 5.

An intermediate coupler 86 fits partially within the cylinder 84. FIG. 8 depicts the intermediate coupler 86 in isolation. The intermediate coupler 86 is also depicted in FIG. 7 which is a cross-sectional view taken along line 7-7 of FIG. 5. The intermediate coupler 86 includes a pipe 88 and a sleeve 90. The pipe 88 and the sleeve 90 are connected orthogonally, for example by the welding and tab arrangement described above. The pipe 88 is dimensioned to fit within the cylinder 84 and to selectively rotate within the cylinder 84 in the direction of arrow 92 exemplarily about the x-axis as depicted in FIG. 1. The pipe 88 includes a slot 94 through both the top and the bottom sides of the pipe 88. The slot 94 extends along an arc of the pipe 88. In an example, the slot 94 defines 45 degrees of arc, while other examples may be more or less than 45 degrees. In still further examples, the slot 94 defines between 15-45 degrees of arc or between 30-45 degrees. A fastener 96, which may non-limitingly be a bolt or a pin, extends through holes 98 in the cylinder 84 and through the slots 94 in the pipe 88. The holes 98 are in alignment and retain the fastener 96 in a fixed position in the x dimension, but the pipe 88 and the rest of the intermediate coupler 86 are able to rotate in the direction of arrow 92 through the arc of rotation defined by the slots 94, while the fastener 96 retains the pipe 88 in connection with the cylinder 84.

It will be recognized that the slot 94 in the pipe 88 and the holes 98 in the cylinder 84 may be reversed with the slots in the cylinder and the holes in the pipe. Similarly the slot 108 in the sleeve 90 and the holes 112 in the projection 104 may be reversed with the slots in the projection and the holes in the sleeve, while remaining within the scope of the present disclosure.

In examples, the lawn grooming implement 12 includes a plate 100 with handles 102. The plate 100 may be welded to the cover 14 or otherwise fastened with rivets, bolts, other mechanical fasteners, or adhesive. In examples, the plate 100 may be considered to be a part of the lawn grooming implement 12 or in other examples, may be considered to be a part of the hitch 10 as described herein. A projection 104 further extends from the plate 100. The projection 104 may be cylindrical and as such may be shaped and dimensioned to be movably retained within the sleeve 90 of the intermediate coupler 86. The projection 104 may be secured to the plate 100 for example by the welding and tab arrangement described above.

The projection 104 fits within the sleeve 90 to selectively rotate within the sleeve 90 in the direction of arrow 106 exemplarily about the y-axis as depicted in FIG. 1. The sleeve 90 of the intermediate coupler 86 includes slots 108 that extend along the arc of the sleeve 90. Similar to slots 94, the slots 108 define an arc. The slots 108 exemplarily define a larger arc than the slots 94, exemplarily 90 degrees of arc, between 80-100 degrees of arc, or between 60-90 degrees of arc. A fastener 110, which may non-limitingly be a bolt or a pin, extends through the slots 108 and also through holes 112 in the projection 104. The holes 112 are in alignment with each other and with the slots 108 such that the fastener 110, when through the holes 112 and the slots 108, retain the projection 104 within the sleeve 90 in the y dimension, but permit the projection 104 to rotate in the direction of arrow 106 through the arc of rotation defined by the slots 108, while the fastener 110 retains the projection 104 within the sleeve 90.

The pivot member 68 thus provides three axes of rotation between the garden tractor 50 and the lawn grooming implement 12. This freedom of movement helps to keep the lawn grooming implement 12 in contact with the ground during use, without placing undue torsion forces on the hitch 10, garden tractor 50, or the lawn grooming implement 12 as the lawn grooming implement 12 is moved over uneven ground. These features present particular utility for a lawn striping implement because improved ground contact between the roller drums 20 and the ground facilitate bending of the cut grass to produce the desired striping effect.

The pipe 88 and the cylinder 84 further include pairs of locking holes 114, 116. The locking holes 114, 116 are shaped and dimensioned to selectively receive a locking pin 118 therethrough. As will be described in further detail herein, a user can selectively position the locking pin 118 through the pairs of locking holes 114, 116 to selectively lock the pipe 88 from rotating within the cylinder 84. The projection 104 and the sleeve 90 further include pairs of locking holes 120, 122. The locking holes 120, 122 are shaped and dimensioned to selectively receive a locking pin 124 therethough. As will be described in further detail herein, a user can selectively position the locking pin 124 through the pairs of locking holes 120, 122 to selectively lock the projection 104 from rotating within the sleeve 90.

As previously described, the hitch 10 is movable between an operative position, for example as shown in FIGS. 1 and 5, and an upright position, for example as shown in FIG. 8. The retention pins 80 of the plates 70 of the hitch 10 selectively retain the pivot member 68 to the mounting bracket 52. The upright position represents a position for storage or transport of the lawn grooming implement 12, for example when the lawn grooming implement is connected to the garden tractor 50, but not in use. While the retention pins 10 limit rotation of the lawn grooming implement 12 in one dimension of rotation, the lawn grooming implement 12 is still rotatable in the other two dimensions as discussed above. However, the locking pins 118 and 124, when inserted through the respective holes, prevent rotation in the other two dimension. This results in a rigid system between the hitch and the lawn grooming implement 12 for retention in the upright position.

Citations to several references are made herein. The cited references are incorporated by reference herein in their entireties. If there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A lawn grooming system comprising:

a hitch, the hitch comprising:

a mounting bracket;

a pivot member pivotably connected to the mounting bracket, the pivot member comprising a cylinder; and an intermediate coupler comprising a pipe and a sleeve, wherein the pipe is rotatably received within the cylinder; and a projection rotatably received within the sleeve;

wherein the projection comprises two opposed holes and the sleeve comprises two opposed slots, wherein the opposed slots of the sleeve are configured to align with the opposed holes of the projection, and further comprising a fastener received through the two opposed slots and the two opposed holes to axially retain the projection within the sleeve and to define an arc of rotation of the projection within the sleeve.

2. The lawn grooming system of claim 1, further comprising a lawn grooming implement connected to the projection and selectively coupled to the hitch.

3. The lawn grooming system of claim 2, wherein the lawn grooming implement is a lawn striping implement, the lawn striping implement comprising:

a cover; and a roller drum rotatably connected to the cover.

4. The lawn grooming system of claim 3, further comprising a plate connecting the projection to the cover.

5. The lawn grooming system of claim 4, wherein the plate comprises at least one handle.

6. The lawn grooming system of claim 1, wherein the mounting bracket comprises a bumper extending between opposed faces, wherein the pivot member is pivotably connected to the opposed faces.

7. The lawn grooming system of claim 6, wherein the mounting bracket comprises flanges extending from the bumper and configured to be secured to the back of a motive device with a plurality of fasteners.

8. The lawn grooming system of claim 6, wherein the pivot member comprises plates that are pivotably connected to the faces wherein arms extend medially from the plates to connect the plates to the cylinder.

9. The lawn grooming system of claim 8, wherein each face comprises a retention hole and the plates each comprise a retention pin configured to selectively project through a respective retention hole to selectively retain the pivot member in an upright position.

10. The lawn grooming system of claim 1, wherein the sleeve is connected orthogonally to the pipe.

11. The lawn grooming system of claim 1, wherein the projection comprises a pair of opposed locking holes and the sleeve comprises a pair of opposed locking holes, wherein the pairs of locking holes are configured to align, and further comprising a locking pin selectively received through the pairs of locking holes to prevent rotation between the projection and the sleeve.

12. The lawn grooming system of claim 1, wherein the pivot member pivots about a first axis in a first dimension, the pipe rotates within the cylinder about a second axis in a second dimension, and the projection rotates within the sleeve about a third axis in a third dimension, wherein at least one of the first, second, and third dimensions are orthogonal to at least another of the first, second and third dimensions.

13. A lawn grooming system comprising:

a hitch, the hitch comprising:

a mounting bracket;

a pivot member pivotably connected to the mounting bracket, the pivot member comprising a cylinder; and an intermediate coupler comprising a pipe and a sleeve, wherein the pipe is rotatably received within the cylinder; and a projection rotatably received within the sleeve;

wherein cylinder comprises two opposed holes and the pipe comprises two opposed slots, wherein the opposed slots of the pipe are configured to align with the opposed holes of the cylinder, and further comprising a fastener received through the two opposed holes and the two opposed slots to axially retain the pipe within the cylinder and to define an arc of rotation of the pipe within the cylinder.

14. The lawn grooming system of claim 13, wherein the cylinder comprises a pair of opposed locking holes and the pipe comprises a pair of opposed locking holes, wherein the pairs of locking holes are configured to align, and further comprising a locking pin selectively received through the pairs of locking holes to prevent rotation between the pipe and the cylinder.

15. The lawn grooming system of claim 13, wherein the projection comprises two opposed holes and the sleeve comprises two opposed slots, wherein the opposed slots of the sleeve are configured to align with the opposed holes of the projection, and further comprising a fastener received through the two opposed slots and the two opposed holes to axially retain the projection within the sleeve and to define an arc of rotation of the projection within the sleeve.

16. A hitch for use in lawn grooming, the hitch comprising:

a mounting bracket;

a pivot member comprising: a cylinder having opposed holes through a side of the cylinder;

an intermediate coupler comprising a pipe and a sleeve, wherein the pipe is rotatably received within the cylinder and the sleeve is configured to rotatably receive a projection therein, wherein the sleeve comprises first opposed slots configured to define an arc of rotation of the projection within the sleeve and the pipe comprises second opposed slots configured to align with the opposed holes of the cylinder within which the pipe is received;

a first fastener secured through the first opposed slots; and a second fastener received through the opposed holes of the cylinder and the second opposed slots of the pipe to axially retain the pipe within the cylinder and to define an arc of rotation of the pipe within the cylinder.

17. The hitch of claim 16, wherein the cylinder pivots relative to the mounting bracket about a first axis in a first dimension, the pipe rotates within the cylinder about a second axis in a second dimension, and the sleeve is configured for the projection to rotate within the sleeve about a third axis in a third dimension, wherein at least one of the first, second, and third dimensions is orthogonal to one-another of the first, second, and third dimensions.

18. The hitch of claim 16, further comprising a first pair of opposed locking holes through the cylinder, a second pair of locking holes through the pipe, and a third pair of opposed locking holes through the sleeve;

wherein a first locking pin is selectively received through first and second pairs of locking holes to prevent rotation between the pipe and the cylinder; and wherein a second locking pin is selectively received through the third pair of locking holes to configure the sleeve to prevent rotation between the sleeve and the projection.

19. The hitch of claim 17, wherein the mounting bracket comprises two opposed faces and each face comprises a retention hole and wherein each opposed plate comprises a retention pin configured to selectively project through a respective retention hole to selectively retain the pivot member in an upright position.

20. The hitch of claim 16, wherein the pivot member further comprises:

opposed plates pivotably connected to the mounting bracket; and arms extending between the cylinder and the opposed plates.

* * * * *